United States Patent [19]

Morgan, Jr. et al.

[11] 4,072,471
[45] Feb. 7, 1978

[54] CATALYTIC CONVERTER FOR REMOVING NOXIOUS COMPONENTS FROM A GASEOUS STREAM

[75] Inventors: Charles R. Morgan, Jr., Wenonah; Paul W. Snyder, Jr., Pitman, both of N.J.

[73] Assignee: Mobil Oil Corporation, New York, N.Y.

[21] Appl. No.: 473,631

[22] Filed: May 28, 1974

[51] Int. Cl.² .......................... B01J 8/00; F01N 3/15
[52] U.S. Cl. ........................... 23/288 FB; 23/288 FC; 23/288 H; 23/288 K
[58] Field of Search ........... 23/288 F, 288 H, 288 FB, 23/288 FC, 288 K; 423/213.7

[56] References Cited

U.S. PATENT DOCUMENTS

| | | | |
|---|---|---|---|
| 1,919,626 | 7/1933 | Finn | 23/288 F UX |
| 2,664,340 | 12/1953 | Hurley | 23/288 F UX |
| 3,065,595 | 11/1962 | Gary | 23/288 F UX |
| 3,142,150 | 7/1964 | Pearlman | 23/288 F UX |
| 3,180,712 | 4/1965 | Hamblin | 23/288 F |
| 3,295,919 | 1/1967 | Henderson et al. | 23/288 F X |
| 3,397,154 | 8/1968 | Talsma | 23/288 F UX |
| 3,441,381 | 4/1969 | Keith et al. | 23/288 FC |
| 3,441,382 | 4/1969 | Keith et al. | 23/288 F |
| 3,755,534 | 8/1973 | Graham | 23/288 F X |
| 3,785,781 | 1/1974 | Hervrt et al. | 23/288 F |
| 3,819,334 | 6/1974 | Yoshida et al. | 23/288 F |
| 3,969,083 | 7/1976 | Givens et al. | 23/288 FB |

*Primary Examiner*—Barry S. Richman
*Attorney, Agent, or Firm*—Charles A. Huggett; Dennis P. Santini

[57] ABSTRACT

A catalytic converter for use in a gaseous stream comprises cylindrical segments of monolithic ceramic impregnated with catalytically active materials, such as hydrocarbon and carbon monoxide conversion catalysts, axially spaced apart by greater than ¼ inch within a cylindrical metal container, said container having a gas inlet upstream from said spaced apart segments and a gas outlet downstream therefrom and a plurality of spaced apart protruding fins attached to the outer circumference thereof.

7 Claims, 18 Drawing Figures

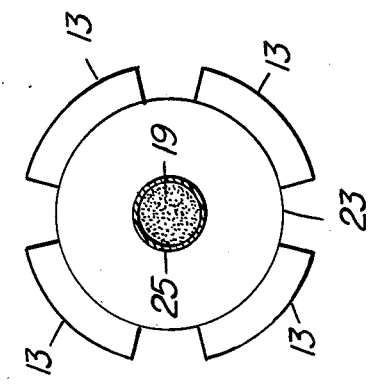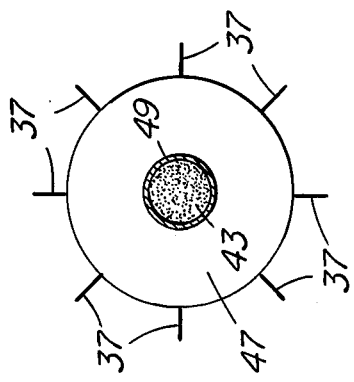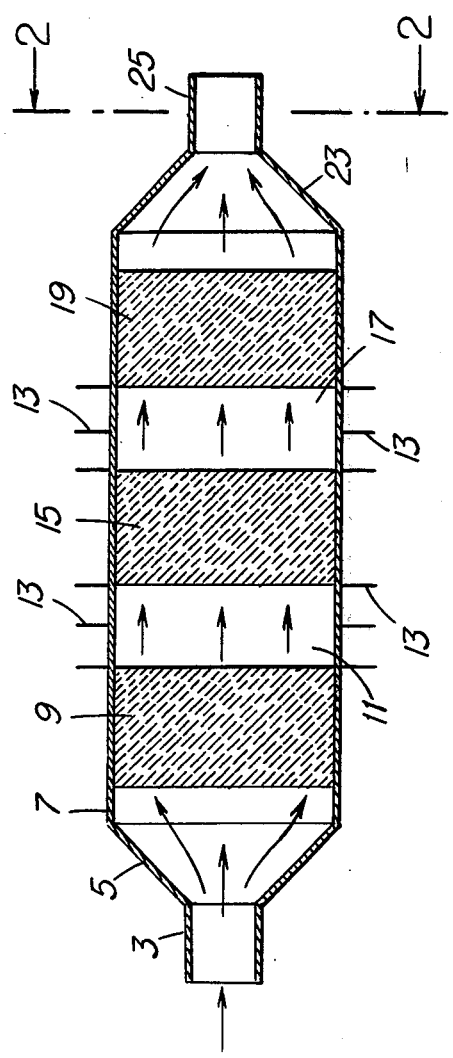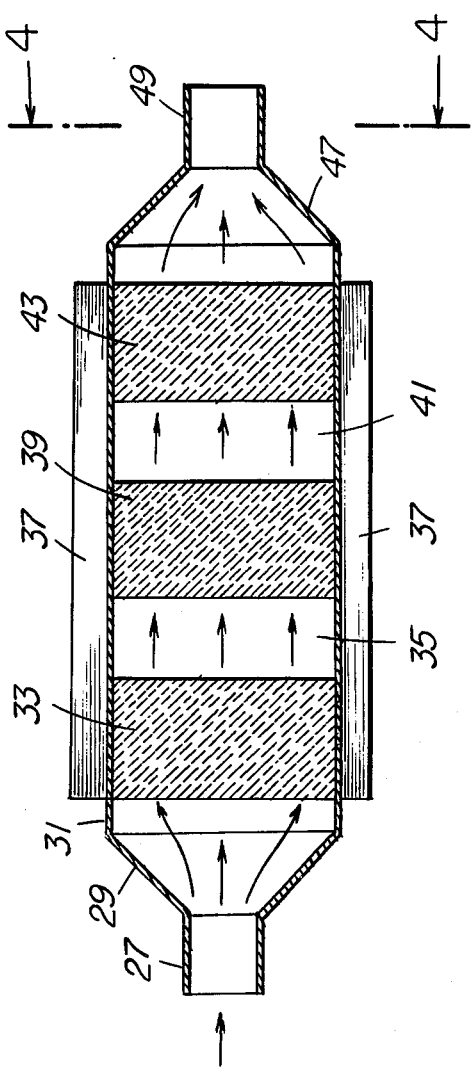

THERMAL RESPONSE in CONVERTER of EXAMPLE 1
To a STEP INCREASE of 8.4% CO

THERMAL RESPONSE in CONVERTER of EXAMPLE 1
To a STEP INCREASE of 1.4% $C_3H_6$

MAXIMUM TEMPERATURE RESPONSE in CONVERTER of EXAMPLE 1 TO STEP INCREASE in $H_2$ CONCENTRATION

MAXIMUM TEMPERATURE RESPONSE TO STEP INCREASE in CO CONCENTRATION

CATALYTIC CONVERTER FOR REMOVING NOXIOUS COMPONENTS FROM A GASEOUS STREAM

BACKGROUND OF THE INVENTION

2. Field of the Invention

This invention is directed to a catalytic converter for removing noxious components from a gaseous stream. More particularly, it is directed to a catalytic converter for use in a gaseous stream, e.g. internal combustion engine exhaust effluent, which comprises cylindrical segments of monolithic ceramic composed of, by way of non-limiting examples, alumina, mullite, cordierite or combinations thereof with one another impregnated with catalytically active materials, such as, for example, hydrocarbon and carbon monoxide oxidation catalysts, axially spaced apart by greater than ¼ inch with a cylindrical metal container, said container having a gas inlet upstream from said spaced apart segments and a gas outlet downstream therefrom. Further, said metal container is provided with a plurality, e.g. two to about 50 or more, and more preferably from about 6 to about 16, of spaced apart protruding metal fins attached to the outer circumference thereof and over the areas of the metal container exposed to the faces of said segments.

2. Discussion of Prior Art

Monolithic ceramic oxidation catalysts used to date in internal combustion exhaust effluent streams have been melted and otherwise thermally damaged under continuous operation due to heat of reaction when high concentrations of combustibles, such as carbon monoxide, hydrocarbons and hydrogen, are present in the exhaust effluent with oxygen. Although several devices have been proposed in the art to prevent such thermal damage, such as, for example, converter by-pass systems, water injection into the exhaust effluent, shut-off of secondary air and feedback control of air-fuel mixtures, they are usually accompanied by a variety of serious disadvantages, such as very high cost, unreliability, special situation effectiveness limitations, increased emissions and low safety.

The present catalytic converter design allows effective use of monolithic ceramic oxidation catalysts under the severe thermal conditions possible in catalytic treatment of the exhaust effluent of internal combustion engines. The proposed converter effectively decreases the thermal response of a monolithic ceramic converter in the high temperature range (i.e. at 1200° F and above) and increases its effective operating life without incurring any of the above disadvantages other than a fractional increase in cost.

Numerous multi-bed catalytic converters are known in the art for oxidation of gaseous combustibles where the catalytic beds are composed of granular, beaded or particulate catalyst materials, thereby creating problems of catalyst disposition within the converter, especially where use thereof would be in a vibrating or roughly bouncing situation, e.g. in the exhaust system of an automobile which may be used over rough roads. The multiplicity of catalyst beds is primarily for the purpose of increasing conversion of the combustible materials comprised in the gaseous effluent stream being contacted therewith. Examples of such converters are described in U.S. Pat. Nos. 3,540,838; 3,503,715; and 3,409,920 and British Pat. Nos. 1,009,609; 942,841 and 1,034,621.

U.S. Pat. No. 3,186,806 teaches a catalytic apparatus, for use in the exhaust effluent of an internal combustion engine, provided with a series of horizontally disposed catalyst cartridges through which exhaust gases successively pass from top to bottom. U.S. Pat. No. 3,180,712 teaches a complicated two-stage catalytic converter-muffler. Each of these latter two mentioned converters employ catalyst in particle form.

SUMMARY OF THE INVENTION

This invention contemplates a catalytic converter for removing noxious components from a gaseous stream, said converter comprising a series of cylindrical segments of monolithic ceramic impregnated with catalytically active oxidation catalysts, said segments being axially spaced apart by greater than ¼ inch within a cylindrical metal container. The metal container housing said cylindrical segments has a gas inlet upstream from said segments and a gas outlet downstream therefrom allowing a gaseous stream containing noxious components such as, for example, carbon monoxide, oxides of nitrogen and various light hydrocarbons, to be routed through said container for serial contact with the spaced apart segments. The container housing said cylindrical segments further has a plurality of metal fins attached to the outer circumference thereof and being disposed over the areas of the container exposed to the faces of said segments.

BRIEF DESCRIPTION OF THE DRAWINGS

FIG. 1 is a cross-sectional view of an embodiment of a catalytic converter according to the present invention.

FIG. 2 is an end view of the converter of FIG. 1.

FIG. 3 is a cross-sectional view of another embodiment of a catalytic converter according to the present invention.

FIG. 4 is an end view of the converter of FIG. 3.

DESCRIPTION OF SPECIFIC EMBODIMENTS

Figure 5:
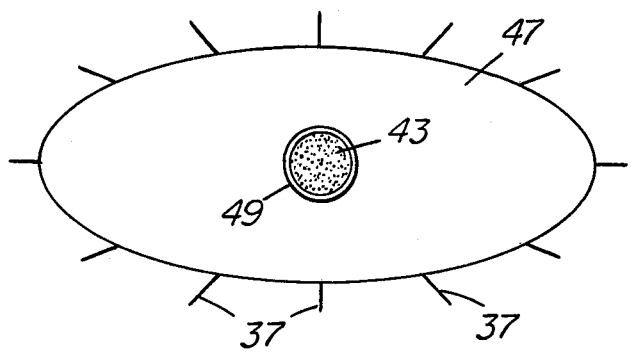
FIG. 5 is an end view of another embodiment of the present invention which has a cross-sectional view identical to that of FIG. 3.

The catalytic converter of the present invention may be manufactured into several differently appearing devices while remaining within the scope of the invention with all its attendant benefits. For example, the metal container housing the segments of monolithic ceramic may be a right cylinder or may be in the shape of an elliptic cylinder of various dimensions. Of course, when the metal container is an elliptic cylinder, the monolithic ceramic segments must also be in the shape of an elliptic cylinder such that they fit inside said container without voids or spaces between the inner container wall and the periphery of the segments.

The monolithic ceramic segments for use in the catalytic converter of this invention may be selected from several commercially available, such as, for example, that shown in U.S. Pat. No. 3,502,596. In general said monolithic ceramic segments will have an external surface area of from about 100 to about 900 $ft^2/ft^3$, a bulk density of from about 10 to about 50 $lb/ft^3$, a pore volume, if said ceramic is composed of alumina, of from about 0.9 to about 6 cc/g and from about 2 to about 500 channels per square inch. The monolithic ceramic segments used herein might preferably have an external surface area of from about 150 to about 850 $ft^2/ft^3$, a bulk density of from about 15 to about 45 $lb/ft^3$ and from about 4 to about 300 channels per square inch.

The monolithic ceramic segments for use herein may or may not be composed of alumina. Those materials useful herein as the monolithic ceramic segments include, as non-limiting examples, alumina, mullite, cordierite and combinations thereof with one another. When the segment is not composed of alumina, an amount of alumina may, if desired, be deposited on the segment material in the amount of from about 1 to about 50 weight percent and more preferably in the amount of from about 5 to about 20 weight percent.

Further physical properties of the monolithic ceramic material useful as the segments in the present invention include the following:

| Property | Range | Preferred Range |
|---|---|---|
| Percent open area | 40–80 | 50–75 |
| Wall thickness, inch | 0.001–0.1 | 0.005–0.05 |

Also, the shape of the channels of the monolithic ceramic material for use herein may be one or more of various geometric shapes, such as, for example, sinusoidal, square, round, hexagonal, elliptical, parabolical, hyperbolical, rectangular, triangular, cycloidal and hypocycloidal.

The catalytically active materials for use in the converter herein described as being impregnated on said monolithic ceramic segments may be selected from a number of commercially available materials or combinations thereof which catalyze oxidation of hydrocarbons, carbon monoxide and/or oxides or nitrogen. Non-limiting examples of such useful catalytic materials include those shown in U.S. Pat. No. 3,428,573, i.e. copper oxide-platinum; U.S. Pat. No. 3,072,458, i.e. platinum and copper; and those shown in the further U.S. Pat. Nos. 3,540,838; 3,503,715; 3,409,920; and the British Pat. Nos. 1,009,609; 942,841 and 1,034,621.

Further catalytic materials useful for impregnation on the monolithic ceramic segments of the present converter include, as non-limiting examples, palladium, rare earth metals, iron, manganese, zinc, copper chromite and combinations thereof with one another.

The catalytic materials above mentioned may be impregnated on said segments by any suitable method known in the art with the sole proviso that said catalytic material be impregnated in quantity sufficient to provide catalytic activity.

Since the axially spaced apart segments within the present converter are so vulnerable to the intense heat associated with internal combustion exhaust effluent streams, when said streams are the gaseous streams being treated by the present converter and the segments are spaced apart by ¼ inch or less, severe thermal damage occurs thereto. Therefore, it has been found, the ceramic segments within the converter must be spaced apart by greater than ¼ inch and, preferably, by from about greater than ¼ inch to about 3 inches, and more preferably by about 2 inches.

The benefits derived from the present converter device are numerous. One benefit is the ability to convert noxious components contained in a gaseous stream to less noxious oxidation products thereof. Another benefit is the ability to do the above conversion under punishing thermal conditions with great success. Another benefit is the ability to continue the above successful conversion over rather long periods of time without the rather costly and troublesome converter replacement required when catalyst materials become thermally damaged.

The benefits obtained hereby are the result of a combination of radiation and convection heat transfer away from the monolithic ceramic segments contained within the converter. Since the segments are spaced apart by greater than ¼ inch and since they are spaced apart axially of each other, radiation heat transfer from the faces thereof is enhanced. The multiple inlet and outlet faces of the monolithic ceramic segments (the hot bodies) provide radiation heat transfer to the metal container shell between the segments (the cold body). Heat is then transferred from the steel container shell to the atmosphere by convection. Since it is important to maintain the temperature of the metal container shell (cold body) below the temperature of the monolithic ceramic segments (hot bodies) for good radiation heat transfer, additional external surface area (exposed to the atmosphere) for convection of heat from said shell to the atmosphere must be obtained by placing a plurality of fins on said shell. Although the fins may be placed over the entire external surface of said container shell, it is necessary that they be at least situated over the areas exposed to the faces of the axially disposed segments.

The fins on the external surface of the container shell may be any length and height and in any number sufficient to provide useful convective heat transfer as above described. A preferred number of such fins would be between about 2 and about 50 or more, and more preferably from about 6 to about 16. The surface area of the external container shell necessary to provide sufficient heat transfer from the shell to the atmosphere will be determinative of the number, length and height of the fins used.

For a more specific definition of the present invention, reference is now made to the drawings, where FIG. 1 depicts a cross-sectional view of an embodiment of a catalytic converter according to the present invention. In FIG. 1, a gaseous stream containing noxious components such as, for example, an internal combustion engine exhaust effluent containing carbon monoxide and light hydrocarbons, passes through inlet 3 and into an embodiment of the catalytic converter of the present invention. The inlet 3 is a right cylinder; and it leads the gaseous stream into the metal converter container 7 via truncated metal conical section 5. The wall of conical section 5 is shaped to fit the inlet at the truncated narrower end thereof and the container 7 at the larger end thereof.

Contained within container 7 are right cylindrical monlithic ceramic segments 9, 15 and 19. Segments 9, 15 and 19 are spaced apart within container 7 such that spaces 11 and 17 of from greater than about ¼ inch to about 3 inches are created.

The gases introduced to the converter of FIG. 1 via inlet 3 then pass through segment 9, space 11, segment 15, space 17 and segment 19, in that order, whereupon said gases exit the converter via outlet 25. Outlet 25 is a right cylinder connected to container 7 by truncated cone 23.

Attached to the external periphery of container 7 over the area thereof surrounding spaces 11 and 17 are metal fins 13. Although fins 13 may be continuous annular rings around container 7, they are segmented annular rings in the embodiment of FIG. 1.

FIG. 2 shows an end view of the converter embodiment of FIG. 1, where monolithic ceramic segment 19 is visible through outlet 25 and the orientation of fins 13 is established.

In FIG. 3, a gaseous stream containing noxious components passes through inlet 27, a right cylinder, and into another embodiment of the catalytic converter of the present invention. The steel converter container 31 is connected to inlet 27 by truncated steel conical section 29, said conical section 29 being shaped to fit the inlet 27 at the truncated narrower end thereof and the container 31 at the larger end thereof.

Contained within container 31 are right cylindrical monolithic ceramic segments 33, 39 and 43, which are spaced apart such that spaces 35 and 41 of from greater than about ¼ inch to about 3 inches are created.

The gases thus introduced into the converter of FIG. 3 then pass through segment 33, space 35, segment 39, space 41 and segment 43, in that order, whereupon said gases exit the converter via outlet 49. Outlet 49 is a right cylinder connected to container 31 by truncated cone 47.

Attached to the external periphery of container 31 and extending nearly the entire length thereof are fins 37.

FIG. 4 shows an end view of the embodiment of FIG. 3 where the orientation of fins 37 is established.

FIG. 5 shows an end view of an embodiment of the present invention which has an identical cross-sectional view to FIG. 3. In this embodiment, however, container 31 is an elliptic cylinder and truncated steel conical sections 29 and 47 are shaped to fit the inlet or outlet right cylinders at the truncated narrower end thereof and the elliptic cylider container at the larger end thereof. Of course, the monolithic ceramic segments contained in such a converter as shown in FIG. 5 are elliptic cylinders.

The angle measured between the inside wall of the metal container of the present converter and the inside wall of the truncated cone in contact therewith may vary between individual embodiments hereof by as much as 60°, with that angle measuring from about 90° to about 150°. The preferred angle described above is from about 120° to about 140°.

It is noted that said metal containers, truncated cores, inlets, outlets and fins may be composed of, for example, steel or aluminum.

The following examples will serve to illustrate the apparatus of the invention without unduly limiting same.

EXAMPLE 1

Since during vehicle operation the internal combustion engine will produce a gaseous stream comprised of combustibles, such as, for example, carbon monoxide, light hydrocarbons and hydrogen, which can cause high temperature excursions in the catalytic converter, the thermal response of a catalytic converter in such a stream is an important evaluation. In this example, a converter similar to the present invention except for the fact that the monolithic ceramic contained therein was one piece (i.e. one segment as opposed to several). The monolithic ceramic was impregnated with platinum as 0.35 weight percent.

Figure 6:
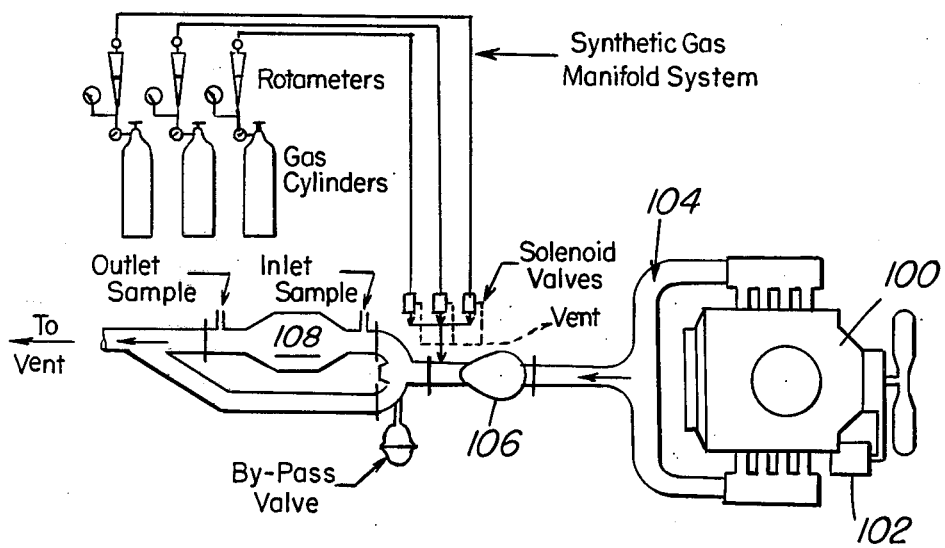
FIG. 6 is a schematic diagram of the experimental apparatus used herein for thermal response study.

The experiment was performed on an engine dyanmometer with the apparatus shown in FIG. 6. Eight cylinder engine 100 of 351 cubic inch displacement and with a two barrel carburetor was run to produce an exhaust effluent. The engine 100 was equipped with air pump 102. The exhaust effluent therefrom passed through insulated exhaust pipe 104 and 100 cubic inch steel bifurcated converter 106. Converter 106 was utilized to remove the residual combustibles from the hot exhaust gas effluent before it was introduced into the catalytic converter 108. With this configuration, the appropriate combustible component of the exhaust effluent could be easily controlled at the desired concentration using the synthetic gas manifold system pictured in FIG. 6.

The feed gas for the catalytic converter was blended by metering the desired rates of the pure components ($CO$, $C_3H_6$, and $H_2$) from gas cylinders through calibrated rotameters into the engine exhaust gas. A step change in the concentration of the combustibles could be accomplished by switching the flow of synthetic gases either to the exhaust gas or to vent using the solenoid valve shown in FIG. 6.

The analytical system was arranged so that a sample could be drawn from either the inlet or outlet of the catalytic converter. Beckman NDIR analyzers were used to measure the concentrations of $CO$, $CO_2$, $NO$ and hydrocarbons. The oxygen was measured with a Servomex paramagnetic analyzer. The combined carburetor air flow, PCV, and secondary air flow were measured using a calibrated laminar flow element.

The thermal response in converter 108 to step changes of $CO$, $C_3H_6$ and $H_2$ was measured as a function of the concentration of the combustible species, the exhaust gas flow rate, the initial bed temperature, and the inlet and outlet cone configurations.

Temperature response profiles were obtained with a steady state exhaust gas flow rate of 23 SCFM, an inlet oxygen concentration of 7-8 weight percent and an initial catalyst temperature of approximately 760° F.

Figure 7:
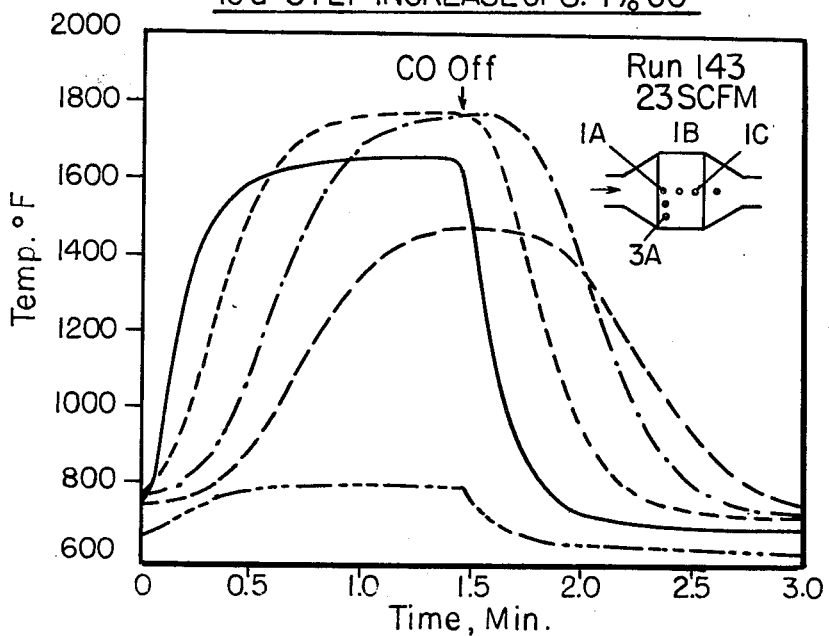
FIGS. 7 and 8 are diagrams of the thermal response in the converter of Example 1, hereinafter described, to a step increase of 8.4 percent carbon monoxide.

The axial thermal response is shown in FIG. 7 for a step increase of 8.4% CO (dry basis). Note that thermocouples are indicated as 1A, 3A, 1B and 1C with other thermocouples located at the inlet and outlet of the converter. Several points are of interest:

(1) The front part of the bed (as indicated by thermocouple 3A which was never more than 40° F lower than 1A) increases 650° F in 15 sec. while the rear portion of the bed (as indicated by thermocouple 1C) increases 650° F in 41 sec.

(2) The maximum converter temperature was achieved in the middle and rear portion of the bed and was 120° F higher than at the front portion of the bed. Therefore, at these conditions, CO is still reacting after the first ½ inch of the bed.

(3) The maximum measured converter temperature was approximately the calculated adiabatic flame temperature.

(4) The outlet temperature as indicated by the thermocouple increased at a much lower rate than the bed temperatures and leveled off at 1480° F while the maximum bed temperature was 1780° F. This indication of a large drop in temperature from the catalyst to outlet is attributed to radiation heat loss from the outlet thermocouple to the colder cone wall. Thus, a thermocouple simply placed at the outlet of the catalyst is not an adequate indicator of high-temperature excursions in a catalytic converter of this type.

(5) The increase in inlet temperature during the pulse of CO was due to radiation heat transfer from the monolith to the thermocouple. The increase in inlet temperature is not due to CO oxidation before the converter inlet sample tap since the inlet CO concentration as calculated from the measured flow rates of exhaust gas and synthetic CO gas was essentially equal to the measured inlet CO concentration.

(6) When the CO feed to the exhaust gas was discontinued, the front portion of the bed cooled more rapidly than the rear portion of the bed.

Figure 8:
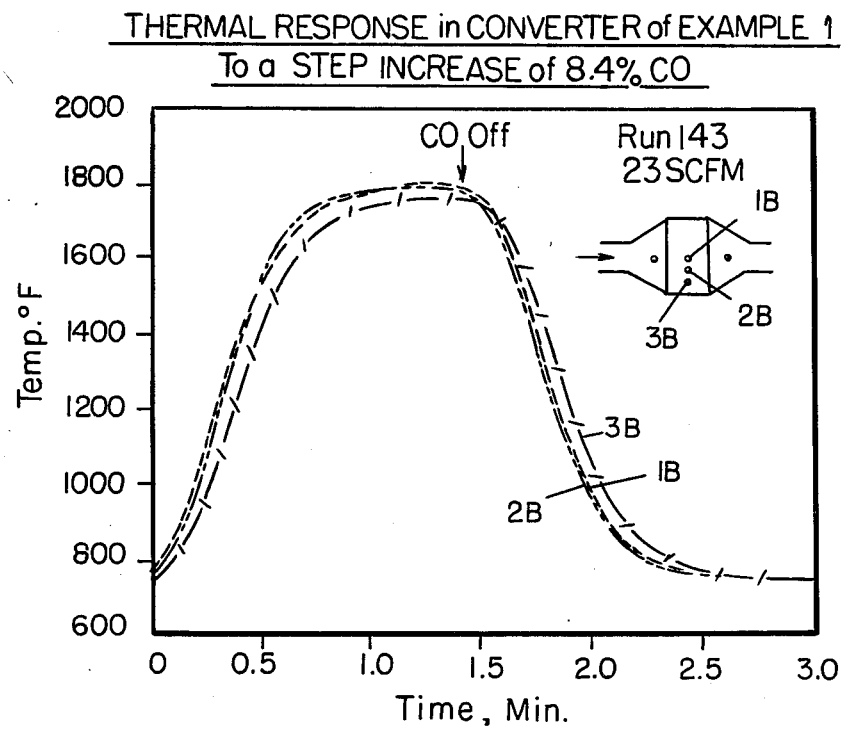

The radial temperature profile during the same step increase in CO (FIG. 8) shows a very small (30° F) temperature gradient radially across the bed between positions 2 and 3. Thermocouples used here are designated 1B, 2B and 3B.

Figure 9:
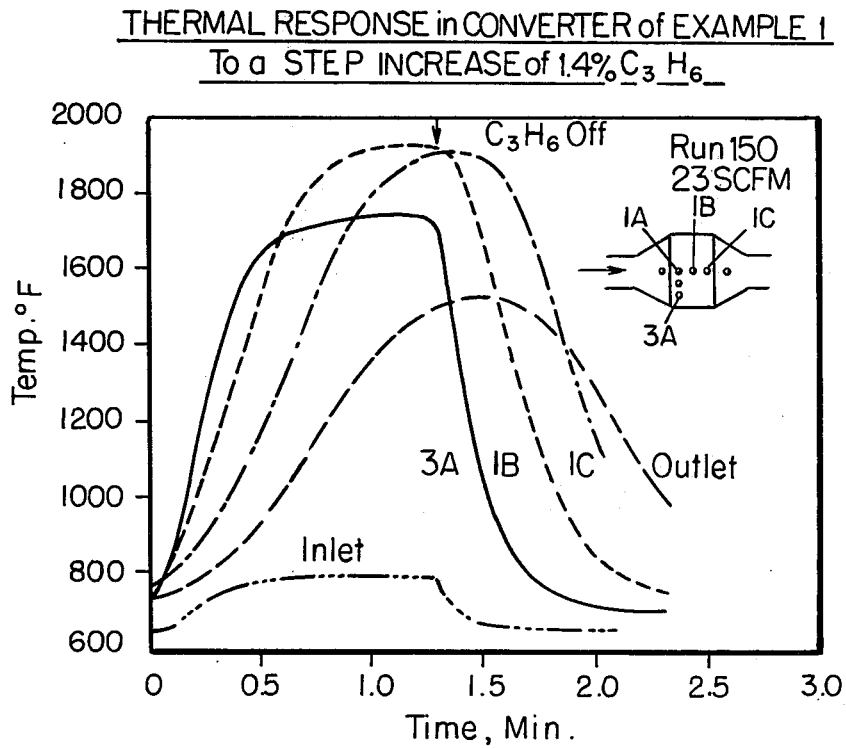
FIG. 9 is a diagram of the thermal response in the converter of Example 1, hereinafter described, to a step increase of 1.4 percent propylene.
Figure 10:
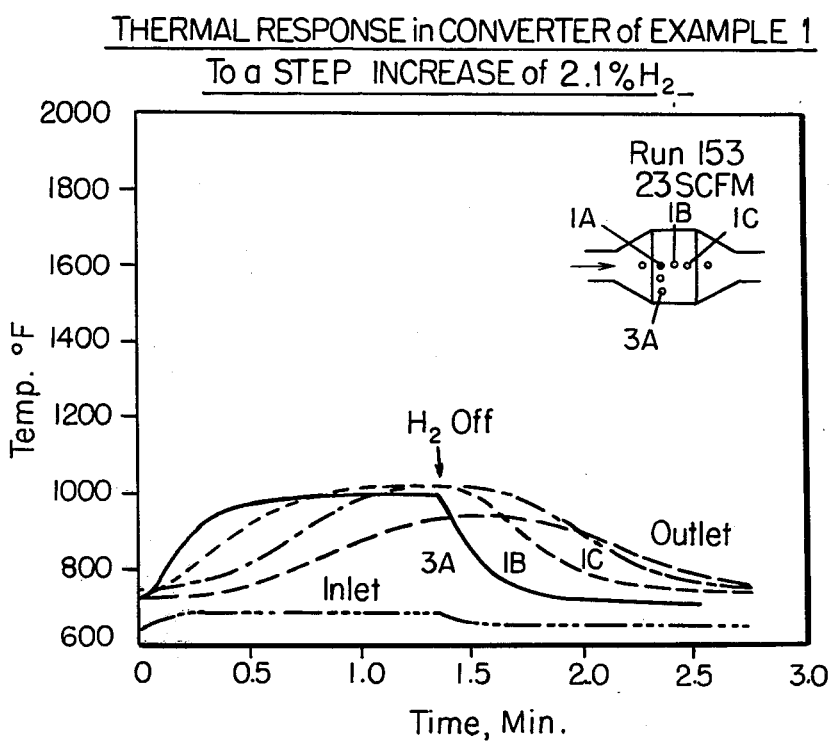
FIG. 10 is a diagram of the thermal response in the converter of Example 1, hereinafter described, to a step increase of 2.1 percent hydrogen.

The axial temperature response to a step increase of $C_3H_6$ (FIG. 9) and $H_2$ (FIG. 10) are similar to that previously shown for CO. The maximum measured temperature in both cases was approximately equal to the calculated adiabatic flame temperature for these concentrations of combustible species.

Figure 11:
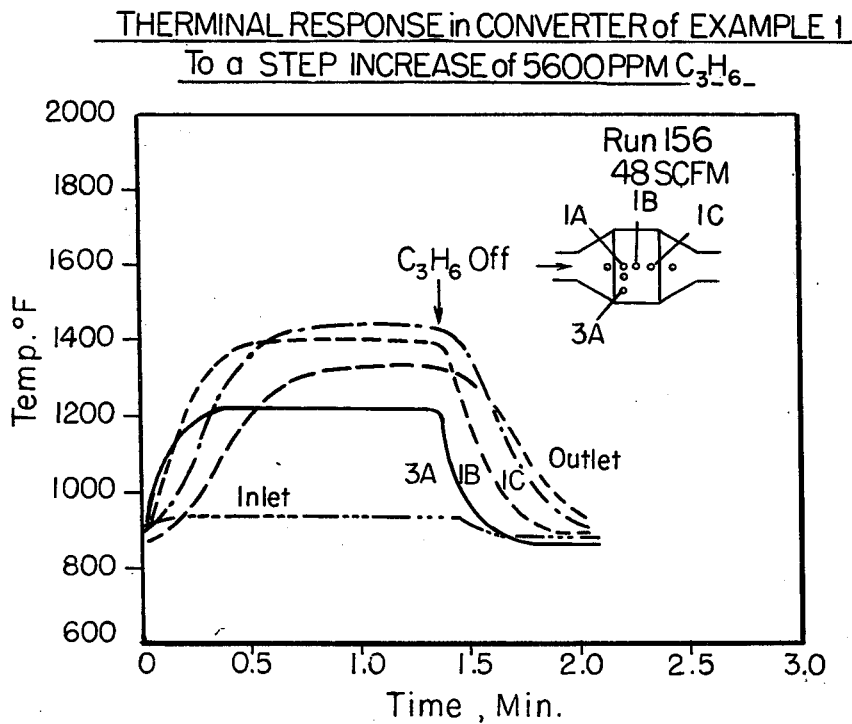
FIG. 11 is a diagram of the thermal response in the converter of Example 1, hereinafter described, to a step increase of 5600 ppm propylene.

A typical temperature response at a higher exhaust gas flow rate, 48 SCFM (FIG. 11) shows that the axial temperature gradient is extended through more than the first 1½ inches of the monolith. However, the maximum measured temperature is still approximately equal to the calculated adiabatic flame temperature.

Figure 12:
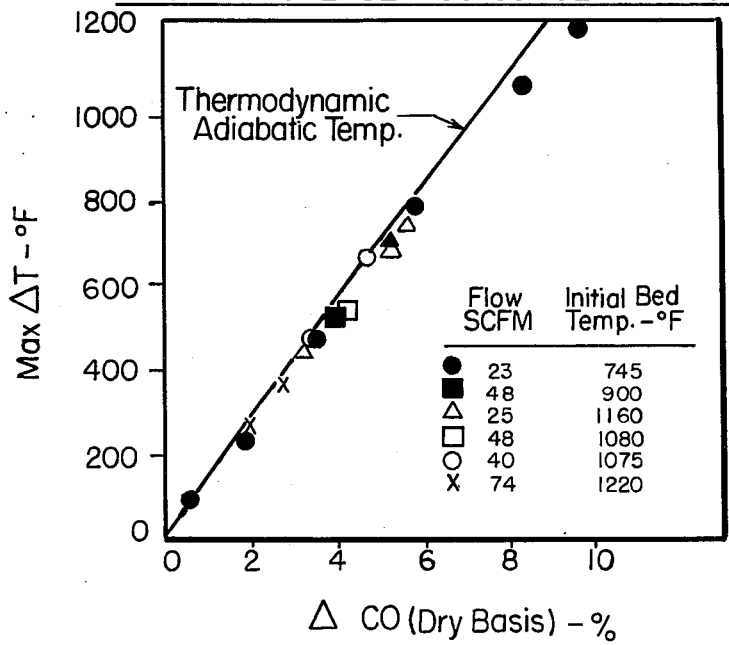
FIG. 12 is a diagram of maximum temperature response in the converter of Example 1, hereinafter described, to a step increase in carbon monoxide concentration.
Figure 13:
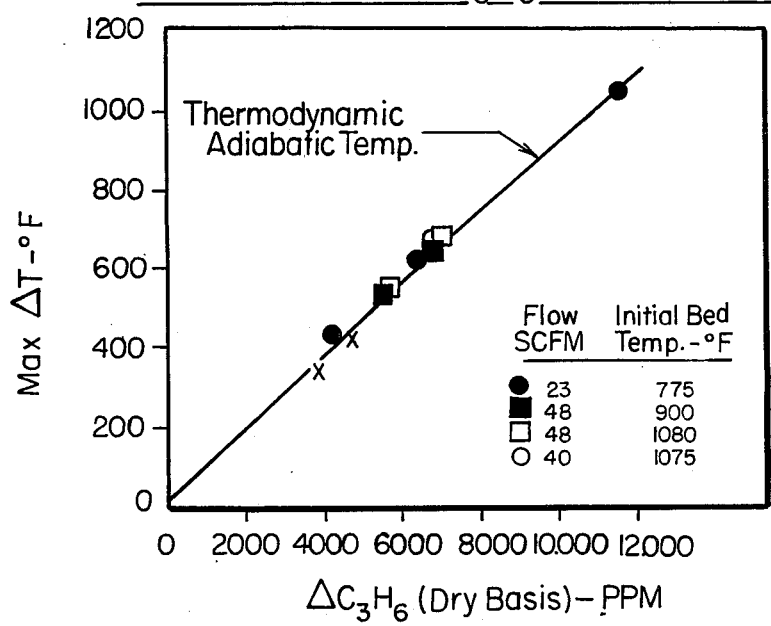
FIG. 13 is a diagram of maximum temperature response in the converter of Example 1, hereinafter described, to a step increase in propylene concentration.
Figure 14:
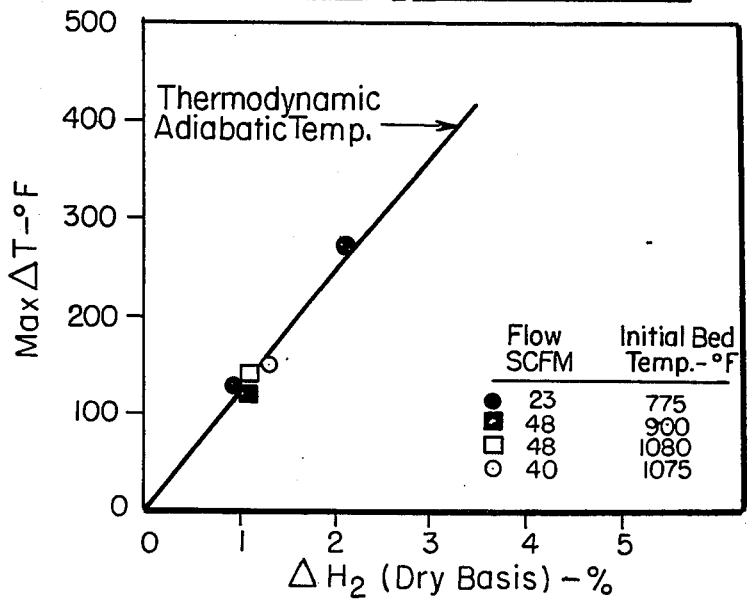
FIG. 14 is a diagram of maximum temperature response in the converter of Example 1, hereinafter described, to a step increase in hydrogen concentration.

The maximum measured temperature response for a wide variety of initial bed temperatures and flow rates for CO, $C_3H_6$ and $H_2$ (FIGS. 12, 13 and 14) are approximately equal to the calculated adiabatic flame temperature. The adiabatic flame temperature for each combustible species is calculated using:

$$\Delta T_i = (H_1 \cdot X_i)/(C_p \cdot M_g)$$

when $\Delta T_i$ = adiabatic temperature increase due to oxidation of species "i", ° F
$H_i$ = reaction heat of species "i", BTU/lb. mole.
$M_g$ = gas molecular weight, lb./lb. mole.
$C_p$ = gas heat capacity, BTU/lb. ° F
$X_i$ = molar concentration of species "i"

EXAMPLE 2

Primarily because the maximum measured converter temperature of the single segment type of Example 1 was approximately the calculated thermodynamic adiabatic temperature and the fact that such high temperatures would create many problems with such converters, converter design modifications were considered which would increase the loss of heat by radiation of high converter temperatures in order to reduce the thermal response of such a catalytic converter, i.e. one employing a monolithic ceramic.

Figure 15:
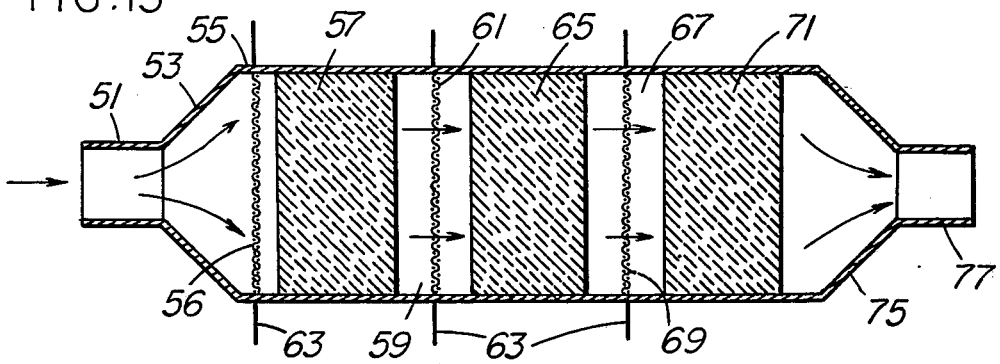
FIG. 15 is a cross-sectional view of a laboratory test catalytic converter according to the present invention (Example 2).

In order to demonstrate the effectiveness of the catalytic converter of the present invention, an embodiment model thereof was constructed as shown in FIG. 15. The model had right cylinder steel inlet 51 and outlet 77 connected to right cylinder steel container 55 by truncated steel cones 53 and 75, respectively. Gaseous streams travelling through the model converter of FIG. 15 passed through monolithic ceramic segment 57, space 59, segment 65, space 67 and segment 71, in that order. The segments were composed of about 85 percent by weight cordierite and about 15 percent by weight mullite. There are stainless steel perforated plates 61 and 69 having 35% open area rigidly held parallel to and equal distant from the segment faces in spaces 59 and 67, respectively. Such a plate, designated 56, was also rigidly held parallel to the segment face in front of segment 57. Segments 57, 65 and 71 were 1 inch thick × 5 inches in diameter and they were spaced apart by 2 inches. Steel clamps 63 attached tightly against and around the outer periphery of container 55 simulated fins. A 0.02 inch thermocouple was inserted in the center of each monolithic ceramic segment through the wall of container 55. The thermocouple in segment 57 was designated "A". The one in segment 65 was designated "B". The one in segment 71 was designated "C". The catalyst material impregnated on said segments was platinum in a quantity of 0.35 weight percent.

The experimental apparatus used to evaluate this converter was the same engine dynamometer test used in Example 1.

Figure 16:
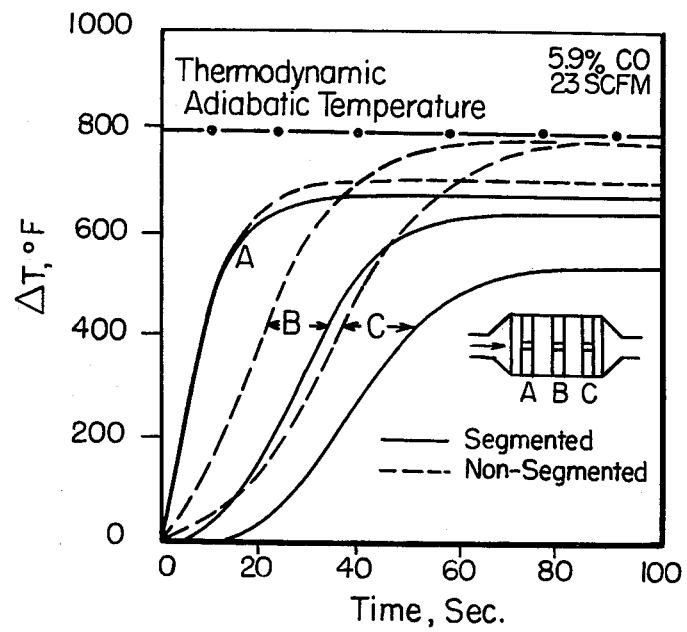
FIGS. 16 and 17 are diagrams of the axial temperature response in the converter of Example 2, hereinafter described, to step increases in carbon monoxide and propylene, respectively.

The thermal response in the converter of Example 2 to step changes of CO, propylene and hydrogen was measured as a function of the concentration of combustible species and the exhuast gas flow rate. The initial catalyst temperature was approximately 1000° F and the inlet oxygen was 7-8%. The converter outlet emission measurements showed essentially complete oxidation of CO and propylene during these runs. A typical axial thermal response for the modified converter is shown in FIG. 16 for a step increase of 5.9% CO (dry basis). In addition, the temperature changes at comparable locations in the converter of Example 1 resulting from the step change are illustrated by the dashed lines. Several points of interest are:

(1) The temperature in the front portion, A, of both types of converters increases initially at the same rate. At steady state, this temperature is only slightly lower in the converter of Example 2.

(2) The temperature in the middle portion, B, of the converter of Example 2 increases at much slower rate than in the converter of Example 1. At steady state, the temperature at position B is lower than at position A in the converter of Example 2 which indicates heat loss between the segments. Conversely, in the converter of Example 1, the steady-state temperature at B is higher than at A which indicates some CO oxidation is occurring after position A.

(3) The steady-state temperature increase at position B in the converter of Example 1 is approximately the thermodynamic adiabatic temperature increase calculated for this step increase of CO. The maximum temperature increase in the converter of Example 2 at A is about 120° F lower than the calculated thermodynamic adiabatic temperature increase.

(4) The temperature in the rear portion, C, of the Example 2 converter also increases at a slower rate than in the Example 1 converter. The steady-state temperature at C is about 110° F lower than at B in the Example 2 converter and indicates significant heat loss between the middle and rear segments. (5) Although the maximum temperature increase in the Example 2 converter is only 110° F lower than in the Example 1 converter, the temperature excursions in the other two segments of the Example 2 converter are 140° F and 250° F lower than in the comparable sections of the Example 1 converter.

Figure 17:
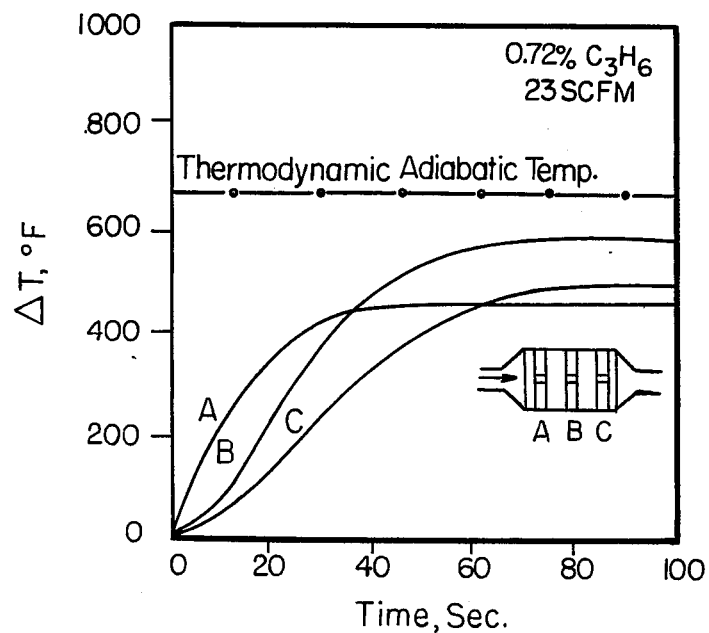

The axial thermal response in the Example 2 converter to a step increase of propylene is shown in FIG. 17. The maximum temperature increase at these conditions occurs in segment B and is about 90° F less than the calculated thermodynamic adiabatic temperature. The steady-state temperature is higher at B than A apparently because a significant fraction of the propylene is oxidized in the second segment. The steady-state temperature at C is 80° F lower than at B and indicates heat loss between the monolithic segments.

Figure 18:
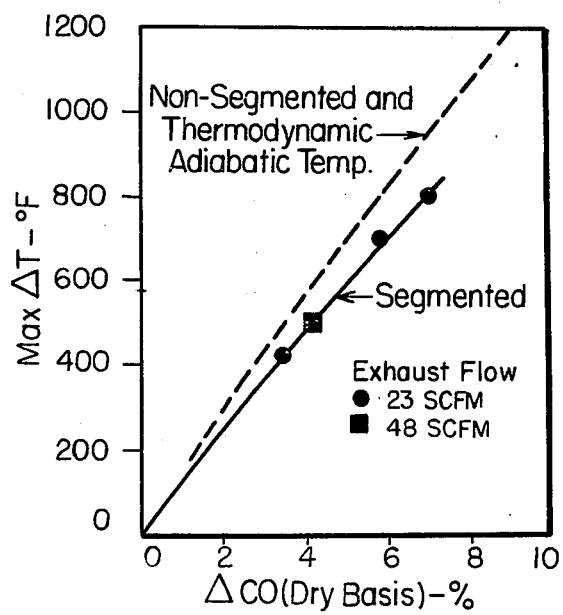
FIG. 18 is a diagram of maximum temperature response in the converter of Example 2, hereinafter described, to a step increase in carbon monoxide concentration.

The maximum temperature increases for the Example 2 converter to step increases of CO are summarized for gas flow rates of 23 and 48 SCFM in FIG. 18. At the higher converter temperatures, this maximum temperature increase is below the temperature increase in a non-segmented converter as in Example 1 which coincides with the thermodynamic adiabatic temperature. Although this deviation is only 130° F at 7% CO, the temperature in the other two segments is even lower. In addition, this deviation would be expected to increase at higher converter temperatures and could means the difference between minor and major thermal damage.

What is claimed is:

1. In a catalytic converter for use in a gaseous stream which comprises cylindrical segments of monolithic ceramic impregnated with one or more catalytically active materials, said segments of ceramic being contained in a cylindrical metal container having a gas inlet upstream from said segments and a gas outlet downstream therefrom and a plurality of spaced apart protruding metal fins attached to the outer circumference thereof, the improvement which comprises having said segments to monlithic ceramic axially spaced apart by about two inches within said metal container.

2. The improvement of claim 1 wherein said segments are right cylinders.

3. The improvement of claim 2 wherein said segments are composed of alumina, mullite, cordierite or combinations thereof.

4. The improvement of claim 3 wherein said segments are impregnated with a catalytic material selected from the group consisting of copper, copper oxide, copper chromite, platinum, palladium, rare earth metal, iron, manganese and zinc.

5. The improvement of claim 1 wherein said segments are elliptic cylinders.

6. The improvement of claim 5 wherein said segments are composed of alumina, mullite, cordierite or combinations thereof.

7. The improvement of claim 6 wherein said segments are impregnated with a catalytic material selected form the group consisting of copper, copper oxide, copper chromite, platinum, palladium, rare earth metal, iron, manganese and zinc.

* * * * *